United States Patent [19]

House et al.

[11] Patent Number: 4,566,976

[45] Date of Patent: Jan. 28, 1986

[54] VISCOUS HEAVY BRINES

[75] Inventors: Roy F. House, Houston; Lonnie D. Hoover, Chappell Hill, both of Tex.

[73] Assignee: NL Industries, Inc., New York, N.Y.

[21] Appl. No.: 622,696

[22] Filed: Jun. 20, 1984

Related U.S. Application Data

[63] Continuation of Ser. No. 330,242, Dec. 14, 1981, Pat. No. 4,459,214.

[51] Int. Cl.$^4$ .......................... C09K 7/02; E21B 43/00
[52] U.S. Cl. ............................. 252/8.5 A; 252/8.55 R; 252/363.5
[58] Field of Search ............ 252/8.5 A, 8.5 C, 8.55 R, 252/363.5; 536/87, 88

[56] References Cited

U.S. PATENT DOCUMENTS

| | | | |
|---|---|---|---|
| 3,356,519 | 12/1967 | Chambers et al. | 106/169 X |
| 4,003,838 | 1/1977 | Jackson et al. | 252/8.5 |
| 4,330,414 | 5/1982 | Hoover | 252/8.5 |
| 4,350,601 | 9/1982 | Mosier et al. | 252/8.55 |
| 4,359,392 | 11/1982 | Rygg | 252/8.55 |

FOREIGN PATENT DOCUMENTS 2000799  1/1979  United Kingdom ............. 252/363.5

Primary Examiner—Herbert B. Guynn
Attorney, Agent, or Firm—Browning, Bushman, Zamecki & Anderson

[57] ABSTRACT

Hydroxyethyl cellulose and a sequestrant are added to a heavy brine containing one or more salts selected from calcium chloride, calcium bromide, and zinc bromide to increase the viscosity of the brine. Preferably the brine contains zinc bromide, has a density in the range from about 14.2–19.2 pounds per gallon, and the sequestrant is a polyphosphonic acid or water soluble salt thereof.

4 Claims, No Drawings

VISCOUS HEAVY BRINES

This is an continuation of Application Ser. No. 330,242, filed Dec. 14, 1981, now U.S. Pat. No. 4,459,214.

BACKGROUND OF THE INVENTION

The present invention relates to viscous brine solutions and, more particularly, to so called heavy brines having a density greater than about 13.5 pounds per gallon.

In recent years, the practical operating range of clear brines for use in the oil and gas industry has been significantly extended by utilizing soluble zinc salts, particularly zinc bromide, so that the advantages of clear brines can now be obtained with fluids having densities as high as 19.2 pounds per gallon at ambient temperatures and pressures.

The high density clear brines are used extensively: as completion fluids, to minimize plugging of perforation tunnels, to protect formation permeability, and to minimize mechanical problems; as workover fluids, for the same reasons; as packer fluids, to allow easy movement and retrieval of the packer; or underreaming, gravel-pack and sand consolidation applications; as kill fluid on ballast fluid; for wire-line work; and as drilling fluids.

Clear brines having a density of 14.2 pounds per gallon (ppg) or lower are generally formulated to contain sodium chloride, sodium bromide, potassium chloride, calcium chloride, calcium bromide or mixtures of these salts. Clear brines having a density up to about 15.1 ppg can be formulated with calcium chloride and calcium bromide; however, if the brine must have a low crystallization temperature, then clear brines in this density range are generally formulated to contain a soluble zinc salt. Zinc bromide is preferred because brines containing it are less corrosive than brines containing zinc chloride. Clear brines having a density greater than about 15.1 ppg are formulated to contain zinc bromide.

Viscous clear fluids are sometimes desired. Generally, hydroxyethyl cellulose (HEC) and xanthan gum polymers are compatible with the fluids which do not contain zinc salts. However, at the higher densities, the hydration of the viscosifiers is significantly slower. HEC is generally considered as unsatisfactory for use in fluids containing zinc salts.

SUMMARY OF THE INVENTION

We have now found that the addition of sequestrants to aqueous heavy salt solutions increases the rate of hydration of HEC in the solutions and increases the viscosity of the solutions containing HEC.

It is, therefore, an object of the present invention to provide viscous heavy brine solutions, particularly such solutions containing zinc bromide and HEC.

Another object of this invention is to provide a method of increasing the rate of hydration of HEC in heavy brines, particularly those brines having a density greater than about 13.5 ppg.

Still another object of this invention is to provide a method of increasing the viscosity of a heavy brine by adding thereto an "activated" HEC, as disclosed more fully hereinafter, and a sequestrant.

The above and other objects of the present invention will become apparent from the description given herein and the appended claims.

DESCRIPTION OF THE PREFERRED EMBODIMENT

The present invention is based on the discovery that the addition of sequestrants to heavy brine solutions increases the rate of hydration of HEC in the heavy brine and increases the viscosity of the heavy brine containing HEC. It is anticipated that similar results would be obtained when utilizing other hydrophilic polymeric viscosifiers such as other cellulose derivatives, xanthan gum, guar gym and derivatives thereof, and other polysaccharides and derivatives thereof.

The heavy brines for use in the present invention contain two or more soluble salts selected from the group consisting of calcium chloride, calcium bromide, zinc bromide, and mixtures thereof. Brines containing only calcium chloride can be formulated having a density from 8.5 to about 11.7 pounds per gallon (ppg). Brines containing only calcium bromide can be formulated having a density from 8.5 to about 14.2 ppg. However, because calcium chloride is much less expensive than calcium bromide, brines in the density range from about 11.3 to about 15.1 ppg are generally formulated to contain both calcium chloride and calcium bromide, depending on the lowest temperature at which the brine will be used. Brines heavier than about 15.0 ppg are generally formulated to contain calcium chloride, calcium bromide, and zinc bromide, or only calcium bromide and zinc bromide depending on the lowest temperature at which the brine will be used. Brines in the density range from 14.2 ppg to 15.0 ppg may be formulated to contain calcium chloride, calcium bromide, and zinc bromide if brines having a lower crystallization point are desired.

The most difficult brines to viscosify contain zinc bromide, and these brines are preferred for use in the present invention. As indicated, such brines will have a density from about 14.2 to about 19.2 ppg.

Generally, brines of any density within the ranges disclosed are prepared by mixing together various standard, commercially available brines, as follows: calcium chloride brines having a density in the range from about 11.0 to about 11.6 ppg; calcium bromide brine having a density of 14.2 ppg; and a calcium bromide/zinc bromide brine having a density of 19.2 ppg containing about 20% calcium bromide and about 57% zinc bromide. Sodium anhydrous calcium chloride and solid calcium bromide are also used in conjunction with these brines to prepare the heavy brines for use in this invention. Standard brine mixing tables are available from the various manufactures of these brines.

The HEC polymers which are useful as viscosifiers in the present invention are solid, particulate materials which are water soluble or water dispersible and which upon solution or dispersion in an aqueous medium increase the viscosity of the system. HEC polymers are generally high yield, water soluble, non-ionic materials produced by treating cellulose with sodium hydroxide followed by reaction with ethylene oxide. Each anhydroglucose unit in the cellulose molecule has three reactive hydroxy groups. The average number of moles of the ethylene oxide that becomes attached to each anhydroglucose unit in cellulose is called moles of substituent combines. In general, the greater the degree of substitution, the greater the water solubility. In general, it is preferable to use HEC polymers having as high a mole substitution level as possible.

Usually, upon the addition of dry, powdered hydrophilic materials, such as HEC, to water, the polymer particles undergo hydration preventing the interior of the particle from readily hydrating, solvating or otherwise dispersing in the aqueous medium. Accordingly, high shear, long mixing times and/or elevated temperatures must be applied in order to obtain a homogeneous system.

We have found that HEC and other hydrophilic polymers can be activated such that the polymers will viscosify heavy brines at ambient temperatures. Activated HEC compositions, and methods for activating HEC, are disclosed in the following listed co-pending patent applications incorporated herein by reference for all purposes: Ser. No. 119,805 filed Feb. 8, 1980, now U.S. Pat. No. 4,330,414, entitled Dispersible Hydrophilic Polymer Compositions; and Ser. No. 146,286 filed May 5, 1980, now U.S. Pat. No. 4,392,964 entitled Compositions and Method for Thickening Aqueous Brines. Methods of activating other hydrophilic polymers are disclosed in co-pending patent application Ser. No. 196,367 filed Oct. 14, 1980, now U.S. Pat. No. 4,427,556, entitled Dispersible Hydrophilic Polymer Compositions, incorporated herein by reference for all purposes.

Activated HEC compositions comprise: (1) HEC, a solvating agent comprising a water miscible, polar organic liquid which when uniformly mixed with HEC in a weight ratio of HEC to solvating agent of 1:2 produces a mixture with substantially no free liquid solvating agent present after remaining quiescent for one week at ambient temperature in a sealed container, and a diluting agent comprising an organic liquid which is not a solvating agent; and (2) HEC, a water soluble organic liquid, and an aqueous liquid, the organic liquid when uniformly mixed with the HEC in a weight ratio of HEC to organic liquid of 1:2 produces a mixture with free liquid present after remaining quiescent for one week at ambient temperature in a sealed container, the aqueous liquid preferably having a pH greater than about 7.0.

Generally speaking, it has been found that virtually any organic compound which passes the solvation test described above, will function, to a usable degree, as a solvation agent. Non-limiting but preferred solvating agents include: aliphatic glycols containing from 2 to 5 carbon atoms such as ethylene glycol, 1,2-propanediol, 1,4-butanediol, 1,3-pentanediol and the like; alkylene triols containing from 2 to 6 carbon atoms such as glycerol, 1,2,3-butane-triol, 1,2,3-pentanetriol, and the like; amides containing from 1 to 4 carbon atoms such as formamide, acetamide, dimethyl formamide, and the like; and the mixtures of the various above compounds.

The diluting agent, in general, will be any liquid organic compound or material which is not a solvating agent. In general, the diluting agents are liquids which do not appreciably swell the HEC polymers, i.e. they do not produce semisolid or viscous mixtures which have no free liquid present after the one week solvation period described in the above test for determining solvating agents. Non-limiting examples of diluting agents include liquid aliphatic and aromatic hydrocarbons containing from 5 to 10 carbon atoms, kerosene, diesel oil, isopropanol, alkylene glycol ethers, vegetable oils, etc. Particularly preferred are organic liquids which are water soluble or miscible most preferably alkanols having at least 3 carbon atoms, ethylene glycol monoalkyl ethers, dialkylene glycol monoalkyl ethers, and the like. The diluting agent will maintain the polymeric composition in a liquid, pourable state at a temperature of about 20° C. It will be understood, however, that lesser amounts of diluting agent can be used if desired and that the ultimate amount of diluting agent employed will depend upon the type of shear which is available to disperse the thickener. In general it has been found that desirable thickeners, which are pourable liquids, can be produced from compositions containing from about 10 to about 25% by weight HEC polymer, from about 2 to about 70% by weight diluting agent, and from about 5 to about 88% solvating agent.

The concentration of HEC need only be a viscosity increasing amount. Generally, the heavy brines of this invention will contain 0.1 to 5 ppb, preferably 0.25 to 3 ppb of HEC.

The sequestrants which are useful in the present invention include polyphosphonic acids, aminopolycarboxylic acids, polyhydroxy carboxylic acids, and the like, and their water soluble salts, particularly the alkali metal, ammonium, and alkanol ammonium salts thereof.

Representative, non-limiting, aminopolycarboxylic acids may be selected from the group of compounds consisting of

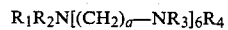

where $R_1$, $R_2$, $R_3$, and $R_4$ are independently selected from the group consisting of $H_7-_{CH_2}COOH$, and $-(CH_2CH_2O)_cH$, C is an integer from 1 to 5, a is an integer from 2 to 6, and b is an integer from 0 to 6, provided that at least one-half of the radicals represented by $R_1$, $R_2$, $R_3$, and $R_4$ are $-CH_2COOH$.

Representative, non-limiting, polyhydroxycarboxylic acids are citric acid, gluconic acid, and the like.

Representative, non-limiting, polyphosphonic acids are set forth in Bush U.S. Pat. No. 3,971,734.

Preferred polyphosphonic acids are selected from the group consisting of the free acids and water soluble salts of:

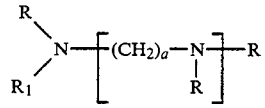

where each R is independently selected from the group consisting of hydrogen, $-CH_2PO(OH)_2$, and $-(C_nH_{sn}O)_cH$ wherein n is 2 to 4 and c is 1 to 3; $R_1$ is

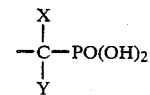

wherein X and Y are independently selected from the group consisting of hydrogen and lower alkyl radicals having 1 to 4 carbon atoms; a is 2 to 6 and b is 0 to 6; provided that at least ½ of the radicals represented by R are $-CH_2PO(OH)_2$;

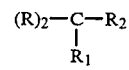

where R is $-CH_2PO(OH)_2$, $R_1$ is selected from the group consisting of hydrogen, hydroxyl, and $-(C_nH_{2n}O)_cH$ wherein n is an integer from 2 to 4 and c is an integer from 1 to 3, and where $R_2$ is selected from the group consisting of lower alkyl radicals containing 1 to 5 carbon atoms and

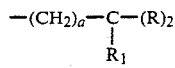

wherein a is an integer from 0 to 8; and

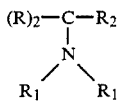

where R is $-CH_2PO(OH)_2$, each $R_1$ is independently selected from the group consisting of hydrogen, $-CH_2PO(OH)_2$, and $-(C_nH_{2n}O)_cH$, wherein n is an integer from 2 to 4 and c is an integer from 1 to 3, and where $R_2$ is selected from the group consisting of lower alkyl radicals containing 1 to 5 carbon atoms and

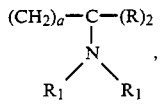

wherein a is an integer from 0 to 8.

Most particularly preferred stabilizing compounds are

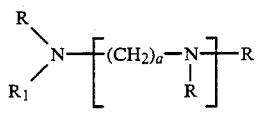

where R is $-CH_2PO(OH)_2$, $R_1$ is $-CH_2PO(OH)_2$, a is either 2 or 6 and b is 0 to 4, especially those compounds wherein b is 0 or wherein a is 6 and 1 to 4.

Other water soluble polyphosphonates that contain at least two phosphonic acid groups per molecular which may be used in the practice of this invention are disclosed in the following United States patents, incorporated herein by reference:

| U.S. Pat. No. | Inventor |
|---|---|
| 3,733,270 | Kerst |
| 3,576,783 | Kerst |
| 3,551,339 | Quimby |
| 3,497,313 | Quimby |
| 3,440,148 | Quimby |
| 3,674,804 | Redmore |
| 3,556,762 | Hamm |
| 3,549,728 | Balde et al |
| 3,400,176 | Quimby |

The concentration of sequestrant useful in the practice of this invention will be an amount sufficient to increase the rate of hydration of HEC in the heavy brine which is desired to be viscosified. Generally, concentrations of sequestrant from about 0.1 to about 7 ppb is sufficient.

To more fully illustrate the present invention, the following non-limiting example is presented. All physical property measurements were made in accordance with testing procedures set forth in STANDARD PROCEDURE FOR TESTING DRILLING FLUID, API RP 13B, Seventh Edition, April, 1978. The physical property parameters referred to in the example are in units expressed as follows:

Apparent Viscosity = centipoise
Plastic Viscosity = centipoise
Yield Point = pounds per 100 square feet
10-Sec. Gel Strength = pounds per 100 square feet

EXAMPLE OF THE INVENTION

An activated HEC gellant was prepared by mixing together 124.5 parts of isopropyl alcohol, 0.5 parts of CAB-O-SIL $M_5$ fumed silica, 50.0 parts of NATROSOL 250 HHR hydroxyethyl cellulose, and 75.0 parts of ethylene glycol. A 15.5 ppg $CaBr_2$ solution and a 19.2 ppg $CaBr_2/ZuBr_2$ solution in a 0.74/0.26 volume ratio. Other 15.5 ppg $CaBr_2/ZnBr_2$ solutions were prepared similarly, except that a 50% aqueous solution of nitrilotri (methylenephosphonic acid) was added in varying amounts to the 19.2 ppg solution before its dilution with the 14.2 ppg solution. The concentration of nitrilotri (methylenephosphonic acid) in the 15.5 ppg brines was 0.84, 2.06, and 7.25 ppb as indicated in Table 1. Thereafter, the brines were viscosified with 2 ppb HEC (10 ppb of the activated gellant composition) by mixing with a Multimixer for 15 minutes. Fann viscosities were then obtained, after the solutions had hydrated for 90 hours at room temperature, and after the solutions were hot rolled for 16 hours at 150° F. The data obtained are given in Table 1.

The data indicate that the sequestrant increased the rate of hydration of the HEC and significantly increased the viscosity of the viscosified brine. However, the brine containing 7.25 ppb of this sequestrant had poor thermal stability as evidenced by the decrease in viscosity on rolling at 150° F.

TABLE I

| Fann V-G Rheology | 2 ppb HEC ppb Nitrilotri (methylenephosphonic acid) | | | |
|---|---|---|---|---|
| | 0 | 0.84 | 2.06 | 7.25 |
| After 15 Minutes Mixing | | | | |
| 600 rpm | 62 | 99 | 125 | 138 |
| 300 rpm | 39 | 67 | 86 | 95 |
| Apparent Viscosity | 31 | 49 | 62 | 69 |
| Plastic Viscosity | 23 | 32 | 39 | 43 |
| Yield Point | 16 | 35 | 47 | 52 |
| 10-Sec. Gel Strength | 1 | 3 | 4 | 5 |
| After 90 Hours Hydration | | | | |
| 600 rpm | 136 | 185 | 240 | 280 |
| 300 rpm | 88 | 121 | 168 | 203 |
| Apparent Viscosity | 78 | 92 | 120 | 140 |
| Plastic Viscosity | 48 | 64 | 72 | 77 |
| Yield Point | 40 | 57 | 96 | 126 |
| 10-Sec. Gel Strength | 4 | 11 | 31 | 42 |
| After Rolling Overnight at 150° F. | | | | |
| 600 rpm | 177 | 239 | 246 | 141 |
| 300 rpm | 124 | 164 | 184 | 82 |
| Apparent Viscosity | 88 | 119 | 123 | 70 |
| Plastic Viscosity | 53 | 75 | 62 | 59 |
| Yield Point | 71 | 89 | 122 | 23 |
| 10-Sec. Gel Strength | 14 | 24 | 35 | 1.5 |
| % Hydration in 15 Minutes* | 31.5 | 40.9 | 46.7 | 115.9 |

*% Hydration in 15 Minutes =
$\frac{\text{300 rpm Reading After 15 Minutes} \times 100}{\text{300 rpm Reading After Rolling @ 150° F.}}$ The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the means and range of equivalence of the claims are therefore intended to be embraced therein.

We claim:

1. A method of increasing the viscosity of a heavy brine solution containing one or more soluble salts selected from the group consisting of calcium chloride, calcium bromide, zinc bromide, and mixtures thereof, and which has a density greater than about 13.5 ppg, which comprises adding to said solution a viscosity increasing amount of a viscosifier selected from the class consisting of (1) hydroxyethyl cellulose, a solvating agent comprising a water miscible, polar organic liquid which when uniformly mixed with hydroxyethyl cellulose in a weight ratio of hydroxyethyl cellulose to solvating agent of 1:2 produces a mixture with substantially no free liquid solvating agent present after remaining quiescent for one week at ambient temperature in a sealed container, and a diluting agent comprising an organic liquid which is not a solvating agent; and (2) hydroxyethyl cellulose, a water soluble organic liquid, and an aqueous liquid, the organic liquid when uniformly mixed with the HEC in a weight ratio of HEC to organic liquid of 1:2 produces a mixture with free liquid present after remaining quiescent for one week at ambient temperature in a sealed container, the aqueous liquid having a pH greater than about 7.0, and from about 0.1 to about 7.0 pounds per 42 gallon barrel of sequestrant selected from the group consisting of polyhydroxy carboxylic acids and the water soluble salts thereof.

2. The method of claim 1 wherein the concentration of hydroxyethyl cellulose is from about 0.1 to about 5.0 pounds per 42 gallon barrel of said brine.

3. A viscous heavy brine solution containing a viscosifier selected from the class consisting of (1) hydroxyethyl cellulose, a solvating agent comprising a water miscible, polar organic liquid which when uniformly mixed with hydroxyethyl cellulose in a weight ratio of hydroxyethyl cellulose to solvating agent of 1:2 produces a mixture with substantially no free liquid solvating agent present after remaining quiescent for one week at ambient temperature in a sealed container, and a diluting agent comprising an organic liquid which is not a solvating agent; and (2) hydroxyethyl cellulose, a water soluble organic liquid, and an aqueous liquid, the organic liquid when uniformly mixed with the HEC in a weight ratio of HEC to organic liquid of 1:2 produces a mixture with free liquid present after remaining quiescent for one week at ambient temperature in a sealed container, the aqueous liquid having a pH greater than about 7.0, one or more soluble salts selected from the group consisting of calcium chloride, calcium bromide, zinc bromide, and mixtures thereof, and which has a density greater than about 13.5 ppg, and from about 0.1 to about 7.0 pounds per 42 gallon barrel of a sequestrant selected from the group consisting of polyhydroxy carboxylic acids and the water soluble salts thereof.

4. The viscous heavy brine of claim 3 containing from about 0.1 to about 5.0 pounds of said hydroxyethyl cellulose per 42 gallon barrel of said brine.

* * * * *